Patented May 17, 1949

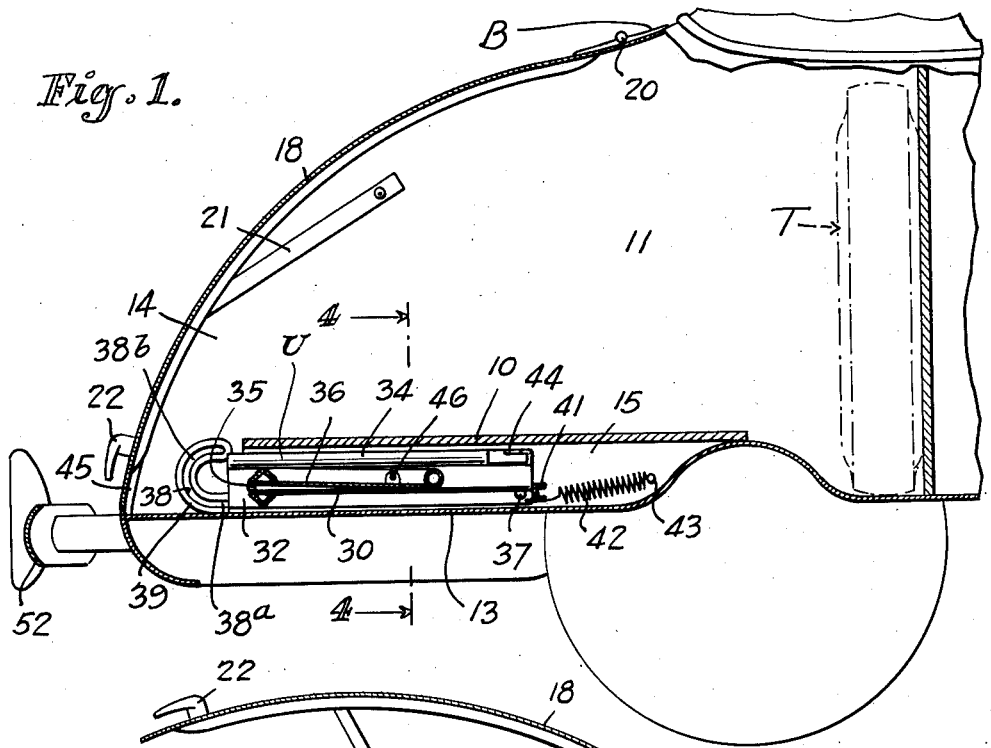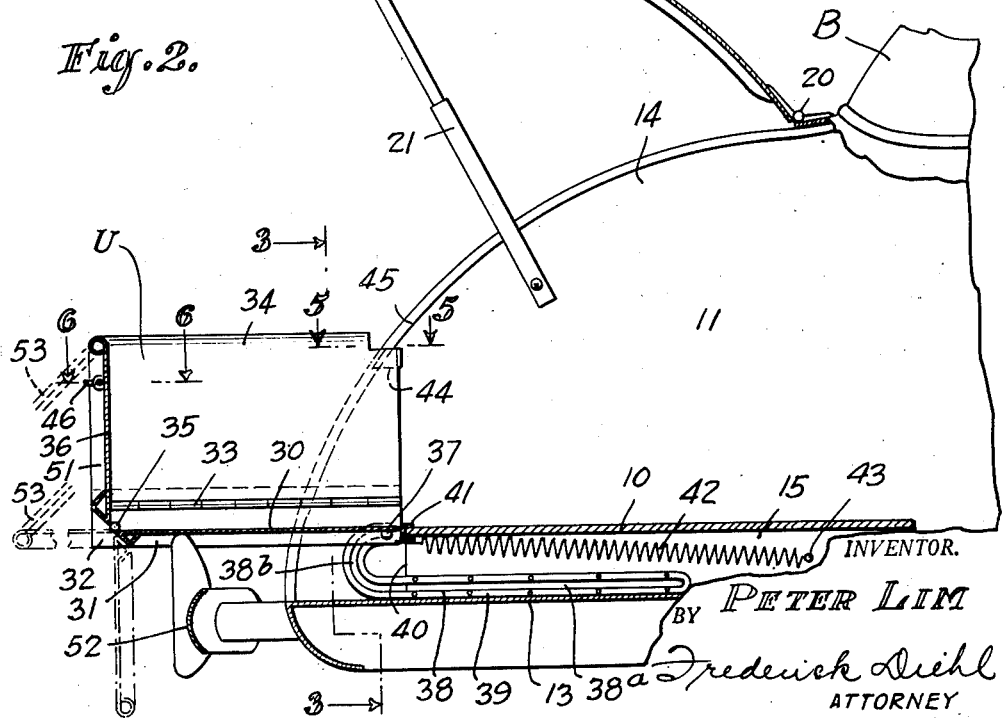

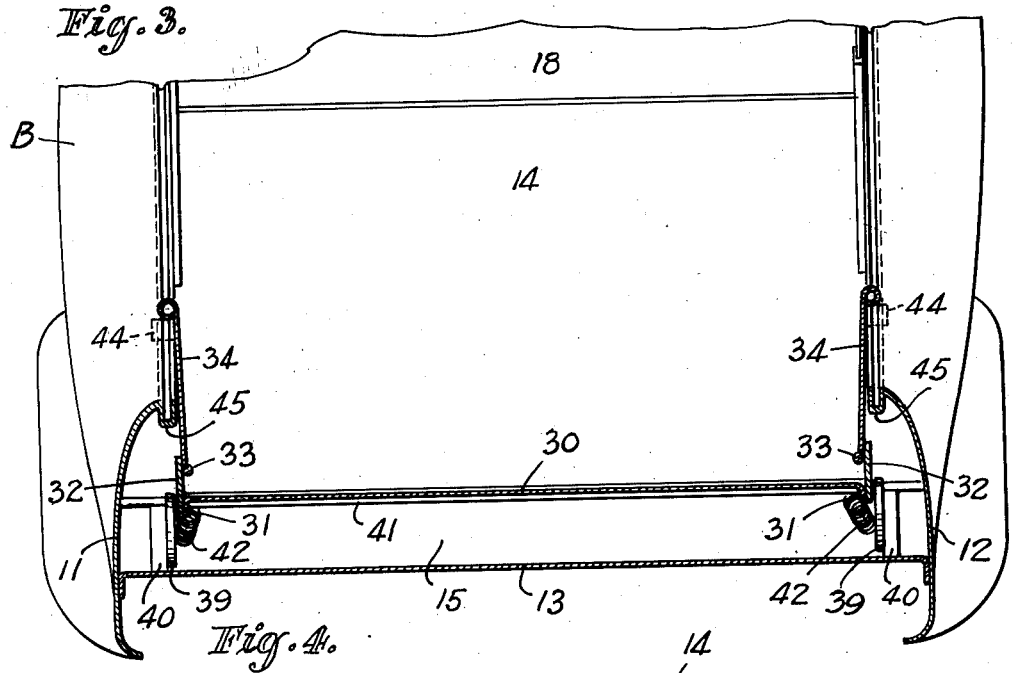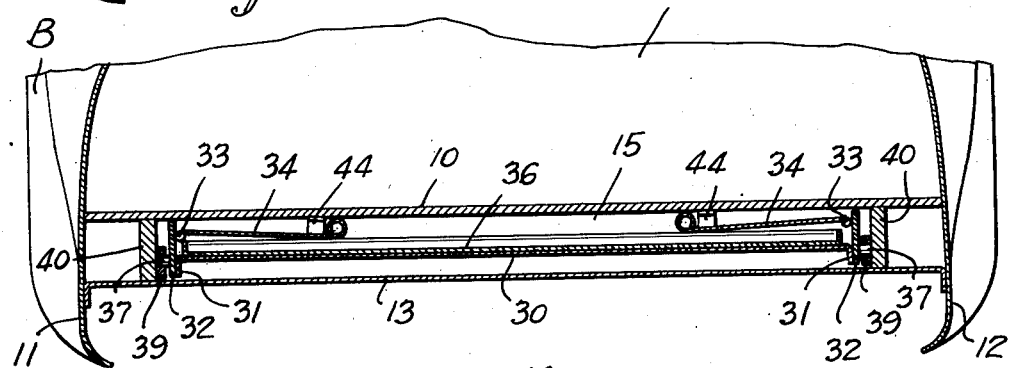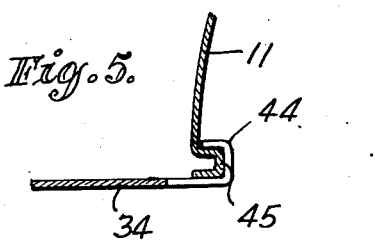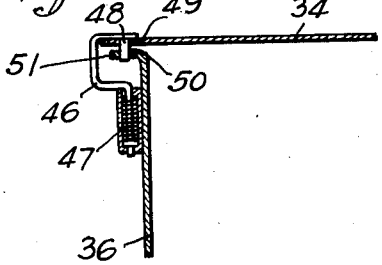

2,470,314

UNITED STATES PATENT OFFICE 2,470,314

STORAGE ATTACHMENT FOR AUTOMOBILE BODIES

Peter Lim, Los Angeles, Calif.

Application May 7, 1945, Serial No. 592,314

9 Claims. (Cl. 296—26)

1

This invention relates to vehicles and particularly to the bodies of pleasure type automobiles of the general character embodied in my copending application for patent Serial No. 483,738, filed April 20, 1943, which has become abandoned.

In the application for patent above identified, there is disclosed and claimed, an automobile of the closed body type such as a coupe or sedan, embodying a storage unit which is adjustably mounted to either project from the rear of the body to rearwardly lengthen the load storage compartment of the body and thus increase the capacity thereof, or to be disposed in a compartment beneath the load storage compartment so as to leave the entire normal capacity available, all to the end of enabling relatively large loads to be conveniently and safely carried without the use of a separate trailer or commercial vehicle to accommodate such loads, and without in any manner changing the exterior appearance of the body.

An object of the present invention is to provide an automobile body with which a storage unit of novel construction is operatively associated in a manner to provide all the aforestated advantages, and in addition thereto obviates the necessity of disturbing any part of a load taking up more or less of the normal capacity of the storage compartment in order to adjust the storage unit from its non-use position in the lower compartment to its position rearwardly enlarging the storage compartment to carry an additional load in the storage unit, or, conversely, to disturb such normal load in the storage compartment in order to reversely adjust the storage unit to its non-use position following removal of the additional load carried by the unit, thus greatly expediting the handling of loads, and reducing the manual labor involved therein.

It is another purpose of the present invention to provide a storage unit of the above described character which can be folded into a relatively flat structure so as to require only a vertically narrow space when occupying its non-use position beneath the floor of the storage compartment, thus permitting the storage compartment to be of maximum height in that type of body in which provision is made for storing the spare tire at a location other than horizontally beneath the floor of the storage compartment, as well as reducing to a minimum, the vertical space required by the unit in its non-use position above a horizontally disposed tire stored beneath the floor of the storage unit, all to the end that with

2 either arrangement, maximum use of the storage capacity of the body can be obtained.

With these and other objects in view, the invention resides in the combinations, arrangements and functional relationships of elements as set forth in the following specification and particularly pointed out in the appended claims.

In the accompanying drawings,

Figure 1 is a vertical longitudinal sectional view of the rear portion of a coupe type of automobile body with the storage unit installed therein and folded in its non-use position beneath the storage compartment;

Figure 2 is a view similar to Figure 1 and illustrating the storage unit unfolded and adjusted to occupy its position for use in rearwardly enlarging the capacity of the storage compartment;

Figure 3 is a fragmentary vertical transverse sectional view taken on the line 3—3 of Figure 2;

Figure 4 is a fragmentary vertical transverse sectional view taken on the line 4—4 of Figure 1; and Figures 5 and 6 are fragmentary enlarged detail sectional views taken, respectively, on the lines 5—5 and 6—6 of Figure 2.

Referring specifically to the drawings, the invention in its illustrated embodiment, is associated with a conventional pleasure type automobile body B such as a coupe or sedan model, wherein provision is made for storing the spare tire T (Figure 1) in a vertical position at the forward end of the storage space of the body, rearwardly of the seats thereof. However, it will be understood that the body B can be of the type in which the spare tire is stored horizontally beneath a horizontal partition or floor 10, which in the present instance co-acts with side walls 11 and 12 and a sub floor 13 to divide the storage space into an upper storage compartment 14 and a vertically narrow lower compartment 15. Should the spare tire be stored in the lower compartment 15, it will be necessary for the latter to be of sufficient height to accommodate a folded storage unit U between the floor 10 and the tire. On the other hand, with the tire stored elsewhere, the permissible narrow lower compartment leaves maximum height available for the storage compartment 14.

The rear ends of the storage compartments 14 and 15 are open for convenient access thereto from the rear of the body, and a closure or lid 18, pivotally mounted at 20 on the body, is adapted to close the compartments. Telescopic braces 21 are provided to releasably retain the closure 18 in its open position shown in Figure 2, and a lock 22 is provided to secure the closure in its closed position shown in Figure 1, all of which is well known in the art.

The storage unit U is constructed of sheet metal to provide a flat bottom 30, to the depending side flanges 31 of which are secured, rectangular plates 32, to whose inner sides are hinged at 33, sides 34. Along the rear edge of the bottom 30 is hinged at 35, a tail gate 36. Projecting from the plates 32 at the forward ends thereof are pins or rollers 37 adapted to travel in slots 38 formed in track or guide members 39 fixed to the confronting sides of vertical supporting members 40 which define the sides of the compartment 15 as shown in Figures 3 and 4.

The slots 38 are composed of straight portions 38a whose lengths extend forwardly and rearwardly in the compartment 15, and whose rear ends are continued into laterally upward and forwardly curved portions 38b which extend throughout approximately 180 degrees as shown in Figure 1, all to the end of mounting the unit U for adjustment to occupy a folded, non-use position in the compartment 15 as shown in Figure 1, or an extended position for use as shown in Figure 2.

Secured to the forward end of the bottom 30 is a connector member 41 of channel cross section adapted to receive the rear end portion of the floor 10 and form a closed joint between the latter and the bottom 30 as shown in the extended position of the unit in Figure 2. Coil springs 42 are connected to the flanges 31 of the bottom 30, and are anchored at 43 to the supporting members 40, the springs being loaded to urge the unit U forwardly of the body B.

Latching lugs 44 project from the forward upper corners of the sides 34 for hooked engagement with the rain gutters 45 on the side walls 11 and 12 of the body, to releasably retain the sides in upright positions in the extended position of the unit as shown in Figures 2 and 5. Latches 46 are mounted on the tail gate 36 and are urged by springs 47 to project their latching pins 48 through keeper openings 49 and 50 in the sides 34 and in end flanges 51 of the tail gate as shown in Figure 6, so as to releasably retain the tail gate in its upright position closing the back of the storage unit as shown in full lines in Figure 2, all in the operation of the invention which is as follows:

With the storage unit U folded, the tail gate 36 rests flat on the bottom 30, and the sides 34 rest flat upon the tail gate as shown in Figures 1 and 4, so that the unit forms a very thin, flat rectangular structure which can enter the vertically narrow compartment 15 and is urged thereinto by the springs 42. The unit is guided in its movement by the pins 37 working in the portions 38a of the slots 38 of the guide members 39, so as to be drawn by the springs to its non-use position in the compartment 15, thus leaving the storage compartment 14 entirely free and unobstructed by the unit.

To use the unit, it is merely necessary to grasp the rear end of same and withdraw the unit from the compartment 15 against the action of the springs 42, the rear of the unit being tilted slightly upward as the unit is being withdrawn, so as to clear the guards of the bumper structure 52. A lifting force is exerted upon the forward end of the unit as the pins reach and travel in the portions 38b of the slots 38, with the connector member 41 finally receiving the rear end portion of the floor 10, and being retained in such connected position by the action of the springs 42 in tending to pull the unit forwardly of the body.

The connector member 41 receives the floor 10 with sufficient freedom to permit the unit to be tilted upwardly about the pins 37, so that upon raising the two sides 34, the latching lugs 44 can pass the rain gutters 45 and have hooked engagement therewith as shown in Figures 2 and 5, upon release of the unit to permit the bottom 30 thereof to rest upon and be supported by the guards of the bumper structure 52 as clearly shown in Figure 2. The tail gate 36 can now be raised and retained by the latches 46 in raised position closing the back of the unit, or can be lowered to, and supported in a horizontal position by suitable chains 53, or can be lowered to a depending vertical position, all as shown in Figure 2.

In its extended position for use, the bottom 30 of the unit forms an unbroken rearward continuation of the floor 10 at the level of the latter, while the sides 34 of the unit form rearward continuations of the body side walls 11 and 12, to thus greatly enlarge the load carrying capacity of the storage compartment 14. To restore the unit to its non-use position in the lower compartment 15, the above described operation is merely reversed, and it will be evident from the foregoing that no part of a normal load occupying the area of the floor 10 need be disturbed in order to adjust the unit U to carry an additional load, or to reversely adjust the unit into the compartment 15 following removal of such additional load, thus greatly expediting the handling of loads, with the attending reduction in the manual labor involved.

Furthermore, due to the flat parcel into which the unit U folds, a vertically narrow compartment 15 will suffice to receive the folded unit, thus leaving a maximum amount of storage space available above the floor 10, as well as for the carrying of additional loads by the unit with the utmost convenience and safety.

I claim:

1. A storage attachment adapted for installation in an automobile body having a partition dividing it into upper and lower compartments, and a lid for closing the compartments, said storage attachment comprising: a storage unit having a bottom and sides mounted thereon for adjustment to occupy a side-forming position and a folded position wherein the unit forms a flat structure; and means mounting said unit on the body for adjustment to occupy a position for use wherein said bottom and sides form rearward continuations of said partition and of the body, respectively; said mounting means including guides by which the unit, when folded, will be guided in said lower compartment to occupy a non-use position therein; said guides having portions guiding said unit vertically when withdrawn from said lower compartment, to occupy said position for use.

2. A storage attachment adapted for installation in an automobile body having a partition dividing it into upper and lower compartments, and a lid for closing the compartments, said storage attachment comprising: a storage unit having a bottom and sides mounted thereon for adjustment to occupy a side-forming position and a folded position wherein the unit forms a flat structure; pins on said unit; fixed guide members having slots receiving said pins; said slots having portions extending longitudinally of the body to guide said unit into and out of said lower compartment, and other portions extending vertically from the rear ends of said first portions, to guide the unit upwardly from said lower compartment to said first mentioned position.

3. A storage attachment adapted for installation in an automobile body having a partition dividing it into upper and lower compartments, and a lid for closing the compartments, said storage attachment comprising: a storage unit having a bottom and sides mounted thereon for adjustment to occupy a side-forming position and a folded position wherein the unit forms a flat structure; pins on said unit; fixed guide members having tracks on which said pins ride; said tracks having straight portions extending longitudinally of the body in said lower compartment, and curved portions extending vertically upward and forward from the rear ends of the first said portions exteriorly of the lower compartment, to guide the unit between a non-use position in the lower compartment and a position for use wherein the unit forms a rearward continuation of said partition and sides of the body.

4. A storage attachment adapted for installation in an automobile body having a partition dividing it into upper and lower compartments, and a lid for closing the compartments, said storage attachment comprising: a storage unit having a bottom and sides mounted thereon for adjustment to occupy a side-forming position and a folded position wherein the unit forms a flat structure; means mounting said unit on the body for adjustment to occupy a position for use wherein said bottom and sides form rearward continuation of said partition and of the body, respectively, and a non-use position in said lower compartment when said sides occupy folded position; means urging said unit into said lower compartment; and means co-acting with said partition and bottom of the unit to maintain an unbroken joint therebetween under the action of said urging means, when the unit occupies said position for use.

5. A storage attachment adapted for installation in an automobile body having a partition dividing it into upper and lower compartments, and a lid for closing the compartments, said storage attachment comprising: a storage unit having a bottom and sides mounted thereon for adjustment to occupy a side-forming position and a folded position wherein the unit forms a flat structure; means mounting said unit on the body for adjustment to occupy a position for use wherein said bottom and sides form rearward continuations of said partition and of the body, respectively, and a non-use position in said lower compartment when said sides occupy folded position; means adapted to urge said unit into said lower compartment; and a connector member co-acting with said partition and bottom of the unit to form a horizontally lapped supporting joint therebetween when said unit occupies its position for use, with said urging means being operative to maintain said joint at said connector member.

6. A storage attachment adapted for installation in an automobile body having a partition dividing it into upper and lower compartments, and a lid for closing the compartments, said storage attachment comprising: a storage unit; fixed guide members having guiding portions extending longitudinally of the body in said lower compartment, and other guiding portions extending vertically upward and forwardly from the rear ends of the first said portions; said unit having means co-acting with said guiding portions to mount the unit for sliding adjustment to occupy a raised position for use, wherein the unit forms a rearward continuation of said partition, and a lowered non-use position in said lower compartment.

7. A storage attachment adapted for installation in an automobile body having a partition dividing it into upper and lower compartments, and a lid for closing the compartments, said storage attachment comprising: a storage unit; fixed guide members having guiding portions extending longitudinally of the body in said lower compartment, and other guiding portions extending vertically upward and forwardly from the rear ends of the first said portions; said unit having means co-acting with said guiding portions to mount the unit for sliding adjustment to occupy a raised position for use wherein the unit forms a rearward continuation of said partition, and a lowered non-use position in said lower compartment; means urging said unit forwardly to maintain it in raised position, and urging the unit into said lower compartment when the unit is lowered out of operative relation to said partition.

8. In a vehicle body having a partition dividing it into upper and lower compartments, a storage unit; guide members secured in the body and having longitudinal guiding portions and other vertically upward and forwardly extending portions at the rear ends of the first said portions; and means carried by the storage unit for co-action with said portions in adjustably mounting the unit in the body to occupy a raised position wherein the unit forms a rearward continuation of said partition, and a lowered position in the lower compartment.

9. In a vehicle body having a partition dividing it into upper and lower compartments, a storage unit; guide members secured in the body and having longitudinal guiding portions and other vertically upward and forwardly extending portions at the rear ends of the first said portions; means carried by the storage unit for co-action with said portions in adjustably mounting the unit in the body to occupy a raised position wherein the unit forms a rearward continuation of said partition, and a lowered position in said lower compartment; and means co-actable with the storage unit to urge same to one or the other of said positions.

PETER LIM.

REFERENCES CITED

The following references are of record in the file of this patent:

UNITED STATES PATENTS

| Number | Name | Date |
| --- | --- | --- |
| 1,209,577 | Heath | Dec. 19, 1916 |
| 1,542,854 | Carlson | June 23, 1925 |
| 1,583,623 | Stern | May 4, 1926 |
| 2,094,401 | Girl | Sept. 28, 1937 |
| 2,160,958 | Critchlow | June 6, 1939 |
| 2,172,405 | Powell | Sept. 12, 1939 |